US012759465B2

(12) United States Patent
Larsson et al.

(10) Patent No.: US 12,759,465 B2
(45) Date of Patent: Oct. 13, 2026

(54) CAMERA MONITOR SYSTEM DISPLAY BRIGHTNESS BALANCING

(71) Applicant: Stoneridge Electronics AB, Solna (SE)

(72) Inventors: Martin Larsson, Bromma (SE); Patrik Kumlin, Grodinge (SE); Filip Ryborz, Alvsjo (SE)

(73) Assignee: STONERIDGE ELECTRONICS AB, Solna (SE)

( * ) Notice: Subject to any disclaimer, the term of this patent is extended or adjusted under 35 U.S.C. 154(b) by 344 days.

(21) Appl. No.: 18/458,402

(22) Filed: Aug. 30, 2023

(65) Prior Publication Data

US 2024/0075880 A1 Mar. 7, 2024

Related U.S. Application Data

(60) Provisional application No. 63/403,010, filed on Sep. 1, 2022.

(51) Int. Cl.
*H04N 7/18* (2006.01)
*B60R 1/27* (2022.01)
(Continued)

(52) U.S. Cl.
CPC ............ *B60R 1/27* (2022.01); *B60R 11/0229* (2013.01); *B60R 11/0264* (2013.01); *B60R 2011/0022* (2013.01); *B60R 2300/108* (2013.01)

(58) Field of Classification Search
CPC ........................................................ B60R 1/27
(Continued)

(56) References Cited

U.S. PATENT DOCUMENTS 4,443,057 A * 4/1984 Bauer ...................... B60R 1/087 359/877
4,917,477 A * 4/1990 Bechtel ................... G02F 1/153 359/603
(Continued)

FOREIGN PATENT DOCUMENTS

DE 4005444 A1 8/1991
DE 19744922 C2 12/1999
(Continued)

OTHER PUBLICATIONS

International Search Report and Written Opinion for International Application No. PCT/EP2023/073937 mailed Nov. 8, 2023.
(Continued)

*Primary Examiner* — Leron Beck
(74) *Attorney, Agent, or Firm* — Carlson, Gaskey & Olds, P.C.

(57) ABSTRACT

A CMS includes first and second cameras that respectively provide first and second fields of view. First and second displays depict at least portions of the first and second fields of view. The first and second displays respectively include a first and second brightness. First and second ambient light sensors are in proximity respectively to the first and second displays and provide a first and second light ambient signal indicative of an amount of ambient light respectively in a region of the first and second displays. A controller is in communication with the first and second displays and is in communication with the first and second ambient light sensors. The controller adjusts one of the first and second brightnesses of one of the first and second displays based upon at least the other of the first and second ambient light signals of the other of the first and second displays.

21 Claims, 6 Drawing Sheets

(51) Int. Cl.
*B60R 11/02* (2006.01)
*B60R 11/00* (2006.01)

(58) Field of Classification Search
USPC .......................................................... 348/148
See application file for complete search history.

(56) References Cited

U.S. PATENT DOCUMENTS 5,825,351 A * 10/1998 Tam ...................... G06F 3/0446 345/157
5,886,744 A * 3/1999 Hannah ................ H04N 19/503 348/207.99
6,218,934 B1 * 4/2001 Regan ....................... B60R 1/12 340/988
6,222,177 B1 * 4/2001 Bechtel ................... G02F 1/163 359/603
6,275,231 B1 * 8/2001 Obradovich .......... B60R 25/241 345/156
6,281,952 B1 * 8/2001 Okamoto .......... G02F 1/133555 349/12
6,507,286 B2 1/2003 Weindorf et al.
6,700,692 B2 3/2004 Tonar et al.
7,744,216 B1 6/2010 Uhlhorn
8,238,968 B1 * 8/2012 Frydman ............. H04W 52/027 348/602
8,339,254 B2 12/2012 Drew et al.
8,797,441 B2 * 8/2014 Patel ...................... H04N 7/141 348/370
9,319,639 B1 * 4/2016 Englander ................. B60R 1/12
9,377,648 B2 6/2016 Tetsuka et al.
9,449,561 B1 * 9/2016 Umansky ............... G09G 5/003
10,170,061 B2 * 1/2019 Files ..................... G06F 3/1423
10,237,547 B1 * 3/2019 Wu ...................... H04N 17/045
10,239,445 B1 * 3/2019 Hendricks ............ H04N 9/3141
11,084,426 B2 8/2021 Englander et al.
2001/0022731 A1 * 9/2001 Dupay ................... B62D 53/10 362/560
2003/0103141 A1 * 6/2003 Bechtel ................ G07C 5/0891 348/E5.037
2006/0007107 A1 * 1/2006 Ferguson ............. G09G 3/3406 345/102
2006/0017807 A1 * 1/2006 Lee ........................... B60R 1/27 348/E7.086
2006/0092182 A1 * 5/2006 Diefenbaugh ........... G09G 5/00 345/207
2008/0158173 A1 * 7/2008 Hamblin ............... G06F 1/1684 345/173
2008/0315785 A1 * 12/2008 Price .................... H05B 41/282 315/277
2009/0122039 A1 * 5/2009 Katoh ............... G02F 1/136227 345/32
2010/0118146 A1 * 5/2010 Schofield .................. B60R 1/30 348/148
2012/0206373 A1 * 8/2012 Van Eerd ............ G06F 3/04883 345/173
2012/0330504 A1 * 12/2012 Nelson ...................... B60R 1/12 348/148
2013/0229519 A1 * 9/2013 Kavuru ................... B60R 11/04 348/148
2013/0328842 A1 * 12/2013 Barnhoefer ........... G06F 3/0443 345/207
2014/0098063 A1 * 4/2014 Rojas ...................... H04M 1/67 345/175
2014/0132452 A1 * 5/2014 DeAngelis ............ G01S 5/0018 342/451
2014/0247353 A1 * 9/2014 Lang ......................... B60R 1/26 348/148
2014/0375704 A1 * 12/2014 Bi ........................ G09G 3/3275 345/694
2015/0279194 A1 * 10/2015 Tseng ............... G08G 1/096775 340/458
2016/0366444 A1 * 12/2016 Sullivan ................. H04N 19/85
2017/0091559 A1 * 3/2017 Hurtado ................. B60Q 9/008
2017/0213507 A1 * 7/2017 Lin .......................... G09G 3/34
2017/0351335 A1 * 12/2017 Kim ....................... G06V 40/28
2017/0353779 A1 * 12/2017 Evans, V ............. H04R 29/001
2018/0005566 A1 * 1/2018 Kurokawa ............. G06N 3/084
2018/0012565 A1 * 1/2018 Dunn ................... G09G 3/3406
2018/0039837 A1 * 2/2018 Song ...................... G06V 20/41
2018/0061313 A1 * 3/2018 Jang ...................... G06F 1/1643
2018/0122335 A1 * 5/2018 Chen ...................... H04N 23/73
2019/0126824 A1 * 5/2019 Oba ........................ E05F 15/70
2020/0372877 A1 * 11/2020 Weindorf ................. H04N 5/58
2021/0155156 A1 5/2021 Pflug et al.
2021/0245662 A1 * 8/2021 Blank ................. B60R 11/0235
2021/0264876 A1 * 8/2021 Peng ........................ G09G 5/10
2021/0287403 A1 * 9/2021 Lang .................... H04N 23/695
2021/0289252 A1 * 9/2021 Choi ........................ H04N 5/50
2021/0305229 A1 * 9/2021 Wu ........................ H10K 50/86
2021/0339686 A1 * 11/2021 Koller .................. H04N 17/002
2021/0405865 A1 * 12/2021 Faulkner ................ H04N 7/147
2022/0324324 A1 * 10/2022 Sohn ...................... B60K 35/81

FOREIGN PATENT DOCUMENTS

| | | | |
|---|---|---|---|
| DE | 19956113 | A1 | 5/2001 |
| DE | 102006040560 | A1 | 3/2008 |
| DE | 202006020468 | U1 | 1/2009 |
| DE | 102009054138 | A1 | 5/2011 |
| DE | 202012101151 | U1 | 6/2012 |
| DE | 10303578 | B4 | 8/2015 |
| EP | 1630778 | B1 | 9/2013 |
| EP | 2216769 | B1 | 3/2017 |
| JP | H08295177 | A | 11/1996 |
| JP | H09185036 | A | 7/1997 |
| KR | 101511587 | B1 | 4/2015 |
| WO | 2022140162 | A1 | 6/2022 |

OTHER PUBLICATIONS

International Preliminary Report on Patentability for International Application No. PCT/EP2023/073937 mailed Mar. 13, 2025.

* cited by examiner

CAMERA MONITOR SYSTEM DISPLAY BRIGHTNESS BALANCING

CROSS-REFERENCE TO RELATED APPLICATION

This application claims priority to Untied States Provisional Application No. 63/403,010 filed Sep. 1, 2022.

TECHNICAL FIELD

This disclosure relates to a camera monitor system (CMS) for use in a commercial truck or similar vehicle, and, in particular, to a CMS having a display brightness control.

BACKGROUND

Mirror replacement systems, and camera systems for supplementing mirror views, are utilized in commercial vehicles to enhance the ability of a vehicle operator to see a surrounding environment. Camera monitor systems (CMS) utilize one or more cameras to provide an enhanced field of view to a vehicle operator. In some examples, the CMS covers a larger field of view than a conventional mirror, or include views that are not fully obtainable via a conventional mirror.

In a typical CMS, there is a camera arm arranged on each of the left- and right-hand sides of the vehicle to provide Class II and Class IV views. A display is provided on the A-pillar on both driver and passenger sides to display the field of view for the camera arm on that side, simulating a conventional mirror.

To ensure that the displays are visible to the driver in various ambient light conditions, each display includes one or more ambient light sensors, which is used to adjust the brightness of that display based upon that display's sensor reading. In one example system, each light sensor is used to adjust a backlight level only of its respective, individual display. Such a system may not perform as desired.

SUMMARY

In one exemplary embodiment, a camera monitor system includes multiple cameras that include first and second cameras that respectively provide first and second fields of view. Multiple displays include first and second displays that are configured to respectively depict at least portions of the first and second fields of view, the first and second displays respectively include a first and second brightness. Multiple ambient light sensors include first and second ambient light sensors that are in proximity respectively to the first and second displays and are configured to respectively provide a first and second light ambient signal indicative of an amount of ambient light respectively in a region of the first and second displays. A controller is in communication with the first and second displays and is in communication with the first and second ambient light sensors. The controller is configured to adjust one of the first and second brightnesses of one of the first and second displays based upon at least the other of the first and second ambient light signals of the other of the first and second displays.

In a further embodiment of any of the above, the controller is configured to determine which of the first and second ambient light signals corresponds to the one of the first and second displays that have a greater brightness than the other of the first and second displays. The controller is configured to increase a brightness of the other of the first and second displays.

In a further embodiment of any of the above, the controller is configured to increase the brightness of the other of the first and second displays by about half the difference between the first and second brightnesses that correspond respectively to the first and second ambient light signals.

In a further embodiment of any of the above, the first and second fields of view respectively capture left and right sides of a vehicle. Each of the first and second fields of view include at least a portion of Class II and/or Class IV views.

In a further embodiment of any of the above, the first and second displays each include a backlight. The first and second brightnesses are provided by the backlight of its respective first and second displays.

In a further embodiment of any of the above, the first and second displays each include pixels, and the controller is configured to adjust the first and second brightnesses by changing pixel intensity of the pixels.

In a further embodiment of any of the above, the first and second ambient light sensors are integrated into its respective first and second display.

In a further embodiment of any of the above, the first and second ambient light sensors are provided on a portion of its respective first and second display at a location other than a backside of the first and second display.

In a further embodiment of any of the above, the first and second displays are respectively mounted on left and right A-pillars within a vehicle cab.

In a further embodiment of any of the above, the controller is provided in at least one of the first and second displays.

In a further embodiment of any of the above, the controller is provided at a location outside of the first and second displays.

In another exemplary embodiment, a method of controlling display brightness in a camera monitor system, the method includes detecting first and second ambient light conditions respectively in a region of first and second displays that are arranged in a vehicle cabin, and adjusting a brightness of at least one of the first and second displays based upon the both of the first and second ambient lights.

In a further embodiment of any of the above, the region of each of the first and second displays is in proximity to opposing A-pillars.

In a further embodiment of any of the above, the detecting step is performed at locations on the first and second displays.

In a further embodiment of any of the above, the method includes a step of calculating first and second display brightness based upon the first and second ambient light conditions, and determining which of the first and second display brightnesses is greater. The adjusting step includes increasing the brightness of the one of the first and second displays that is darker than the other of the first and second display brightness.

In a further embodiment of any of the above, the brightness of the darker display is increased by half the difference between the first and second ambient lights.

In a further embodiment of any of the above, the brighter of the first and second display is not adjusted.

In a further embodiment of any of the above, the adjusting step is performed based upon a preset cabin illumination value.

In a further embodiment of any of the above, the calculating step is performed based upon a configurable lookup table.

In a further embodiment of any of the above, the method includes filtering jitter from first and second signals respectively from the first and second ambient light sensors.

In a further embodiment of any of the above, the method includes filtering spike from first and second signals respectively from the first and second ambient light sensors.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1A:
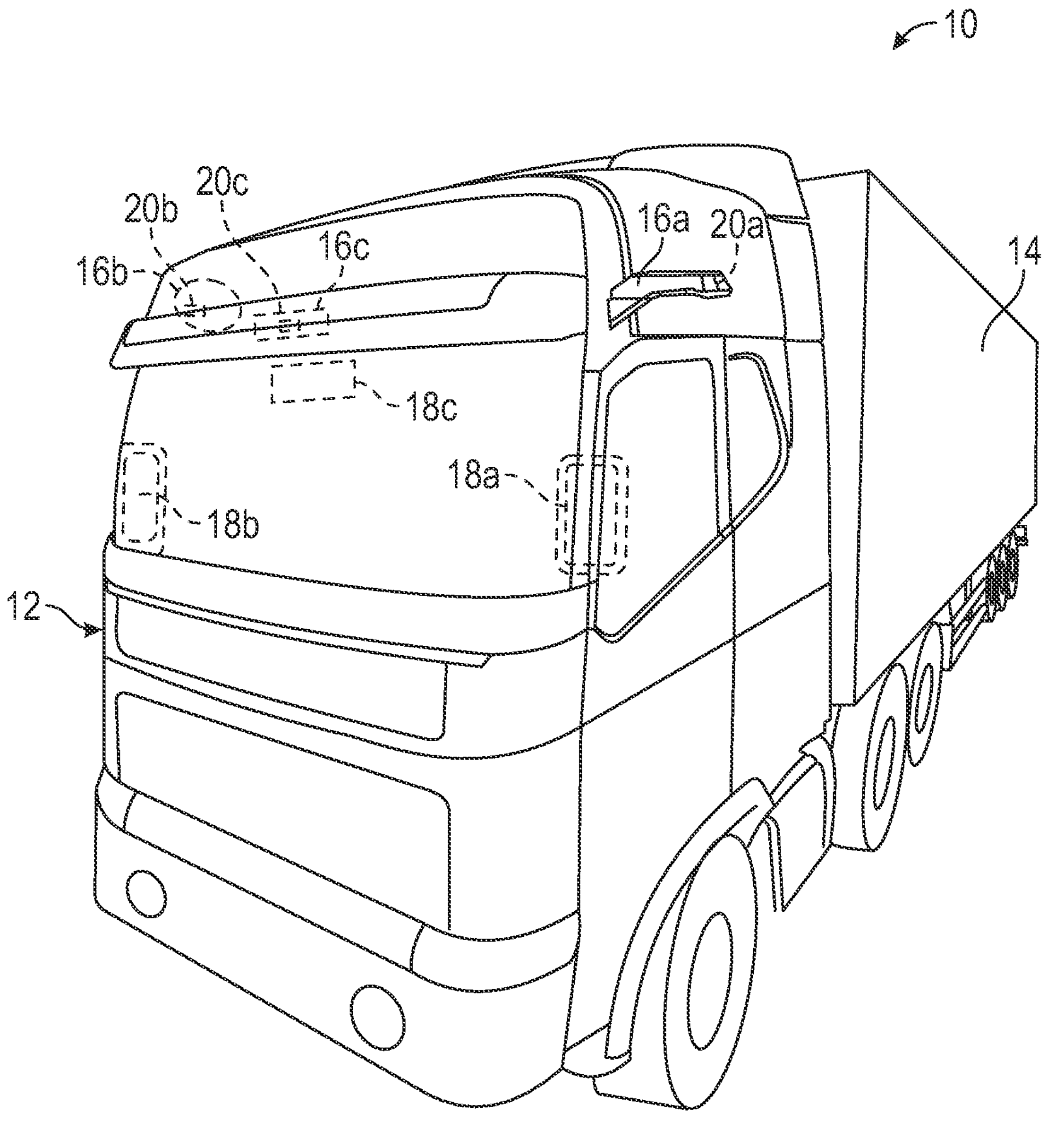
FIG. 1A is a schematic front view of a commercial truck with a camera monitor system (CMS) used to provide at least Class II and Class IV views.
Figure 1B:
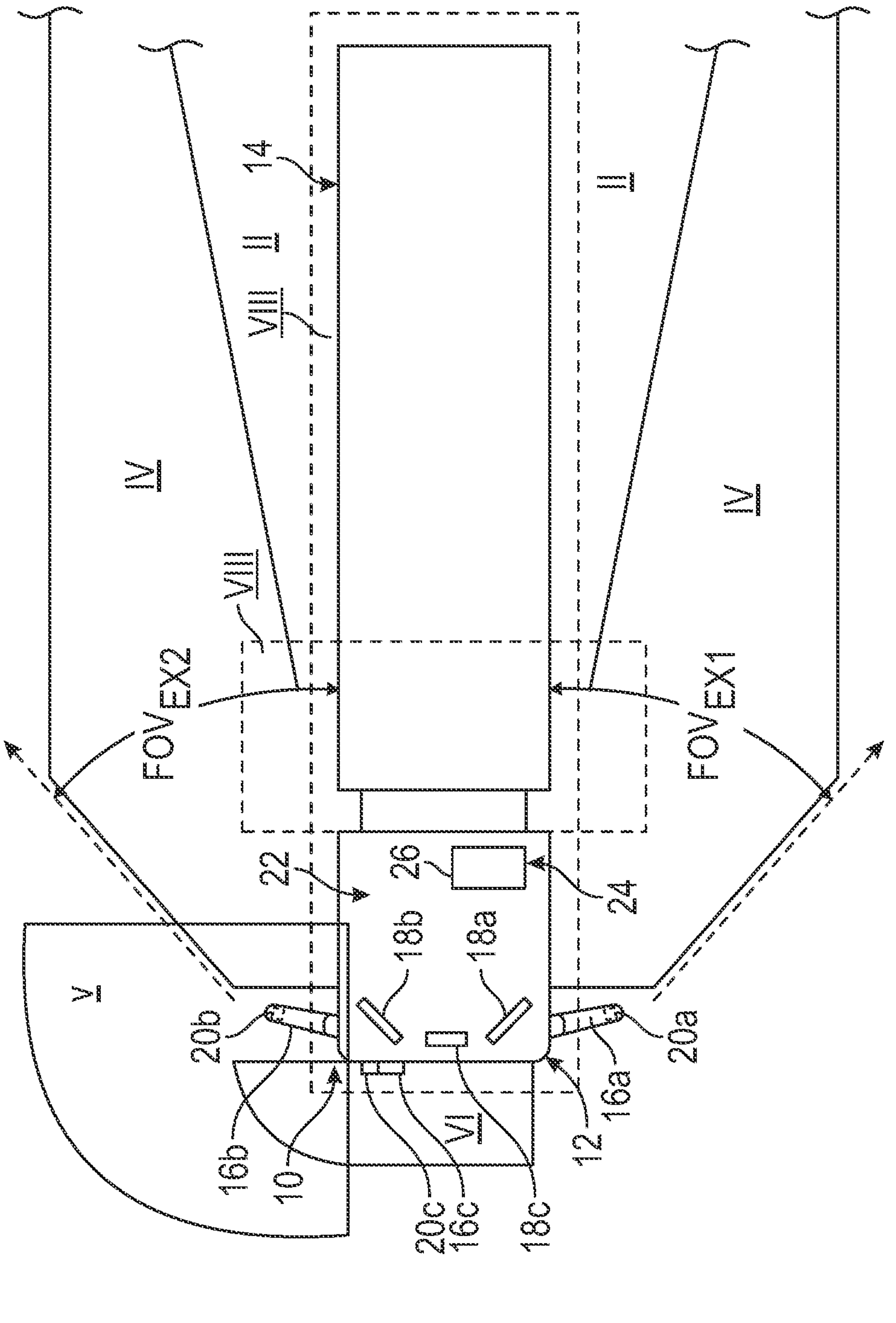
FIG. 1B is a schematic top view of a commercial truck with a camera monitor system providing Class II, Class IV, Class V and Class VI views.

A schematic view of a commercial vehicle 10 is illustrated in FIGS. 1A and 1B. The vehicle 10 includes a vehicle cab or tractor 12 for pulling a trailer 14. It should be understood that the vehicle cab 12 and/or trailer 14 may be any configuration. Although a commercial truck is contemplated in this disclosure, the invention may also be applied to other types of vehicles. The vehicle 10 incorporates a camera monitor system (CMS) 15 (FIG. 2A) that has driver and passenger side camera arms 16*a*, 16*b* mounted to the outside of the vehicle cab 12. If desired, the camera arms 16*a*, 16*b* may include conventional mirrors integrated with them as well, although the CMS 15 can be used in some examples to entirely replace mirrors. In additional examples, each side can include multiple camera arms, each arm housing one or more cameras and/or mirrors.

Each of the camera arms 16*a*, 16*b* includes a base that is secured to, for example, the cab 12. A pivoting arm is supported by the base and may articulate relative thereto. At least one rearward facing camera 20*a*, 20*b* is arranged respectively within camera arms 16*a*, 16*b*. The exterior cameras 20*a*, 20*b* respectively provide an exterior field of view $FOV_{EX1}$, $FOV_{EX2}$ that each include at least one of the Class II and Class IV views (FIG. 1B), which are legal prescribed views in the commercial trucking industry. The Class II view on a given side of the vehicle 10 is a subset of the class IV view of the same side of the vehicle 10. Multiple cameras also may be used in each camera arm 16*a*, 16*b* to provide these views, if desired. Class II and Class IV views are defined in European R46 legislation, for example, and the United States and other countries have similar drive visibility requirements for commercial trucks. Any reference to a "Class" view is not intended to be limiting, but is intended as exemplary for the type of view provided to a display by a particular camera. Each arm 16*a*, 16*b* may also provide a housing that encloses electronics, e.g., a controller, that are configured to provide various features of the CMS 15.

First and second video displays 18*a*, 18*b* are arranged on each of the driver and passenger sides within the vehicle cab 12 on or near the A-pillars 19*a*, 19*b* (generally, A-pillar 19) to display Class II and Class IV views on its respective side of the vehicle 10, which provide rear facing side views along the vehicle 10 that are captured by the exterior cameras 20*a*, 20*b*.

If video of Class V and/or Class VI views are also desired, a camera housing 16*c* and camera 20*c* may be arranged at or near the front of the vehicle 10 to provide those views (FIG. 1B). A third display 18*c* arranged within the cab 12 near the top center, left or right of the windshield can be used to display the Class V and Class VI views, which are toward the front of the vehicle 10, to the driver. The displays 18*a*, 18*b*, 18*c* (generally, display 18) face a driver region 24 within the cabin 22 where an operator is seated on a driver seat 26. The location, size and field(s) of view streamed to any particular display may vary from the configurations described in this disclosure and still incorporate the disclosed invention.

If video of Class VIII views is desired, camera housings can be disposed at the sides and rear of the vehicle 10 to provide fields of view including some or all of the Class VIII zones of the vehicle 10. In such examples, the third display 18*c* can include one or more frames displaying the Class VIII views. Alternatively, additional displays can be added near the first, second and third displays 18*a*, 18*b*, 18*c* and provide a display dedicated to providing a Class VIII view.

Figure 2A:
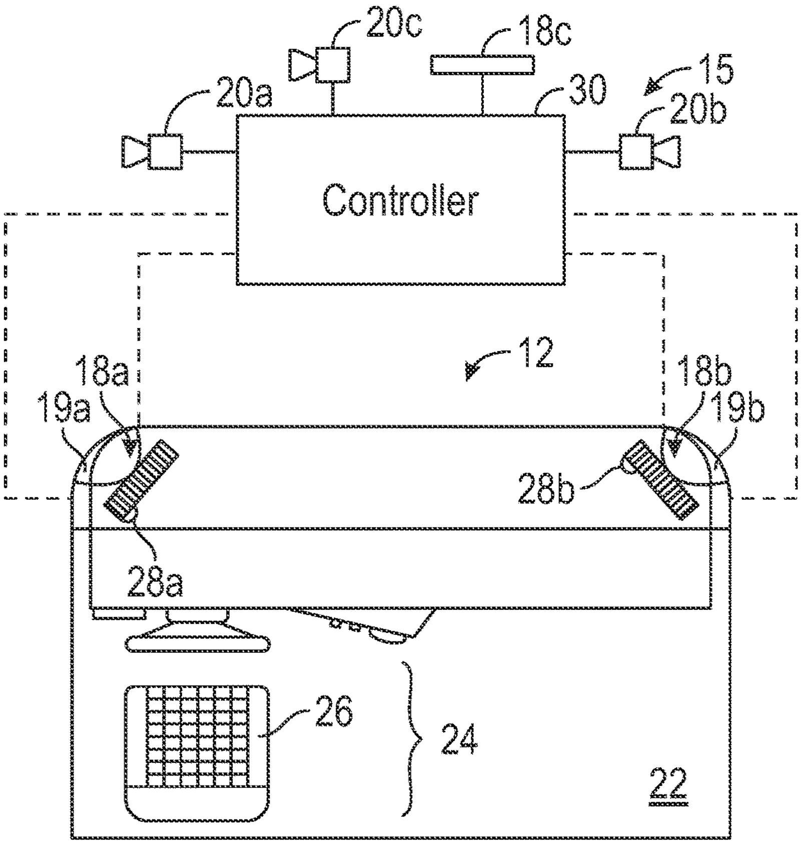
FIG. 2A is a schematic top view of a vehicle cabin including displays.
Figure 2B:
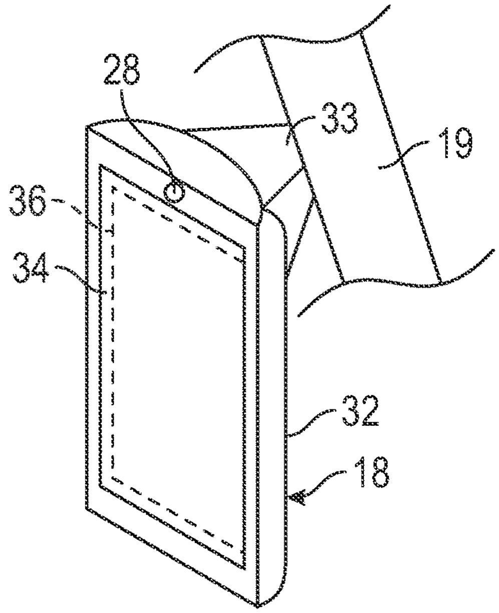
FIG. 2B is a perspective view of one example display according to the disclosed camera monitor system (CMS).

Referring to FIGS. 2A and 2B, each display 18*a*, 18*b* (and perhaps others, if desired) includes a housing 32 mounted to its respective A-pillar 19 by a bracket 33, for example, or integrated into vehicle trim. A screen 34 is mounted in a front of the housing 32 facing the driver. The screen 34 can be any suitable screen such as TFT, LCD, LED, OLED and others. Each type of screen typically employs some approach for adjusting perceived brightness. For example, if each display 18 is an LCD, the screen will typically include a backlight 36 that can be adjusted to make the screen 34 more visible to the driver in various ambient light conditions. Low ambient lighting conditions use relatively little backlight as compared to bright ambient lighting conditions.

To provide automatic adjustment of a display's brightness, each display 18*a*, 18*b* respectively includes a first and second ambient light sensor 28*a*, 28*b* (generally, ambient light sensor 28) configured to sense an amount of ambient light in a region around the display. The ambient light sensors 28 are arranged to detect light in the environment around the displays 18. Environmental light conditions, such as bright sunshine, may make it difficult for the driver to view the images on one or both the displays 18. In an LCD display, for example, the brightness of the display 18 is using a backlight 36. Other display adjustments are possible, as will be appreciated below. The ambient light sensor 28 can be mounted on the A-pillar, dash or other location; however, providing the ambient light sensor 28 on the front of the housing 32, so that the A-pillar does not obstruct light to it, should most closely approximate the ambient light near the screen 34. Although only one ambient light sensor 28 is shown for each display 18, more ambient light sensors may be used, if desired.

The disclosed CMS 15 operates to improve display visibility to the driver in different ambient lighting conditions. Typically digital rearview (or front or side) displays adjust brightness level individually based on a light sensor that measure surrounding light. However, when the light is coming from one side of the vehicle, like low setting sun, automatic brightness adjustments to each display based upon its individual, independent ambient light sensor may not provide satisfactory brightness adjustment for the multiple CMS displays. For example, bright sunlight from one side may result in one monitor receiving a lot of light causing an automatic high brightness adjustment for that display (as expected), but the other displays ambient light sensor may be in shadow, resulting in a low brightness level. This can be a problem for the driver because this darker monitor needs to be bright as well, since the driver's eyes are adjusting to the surrounding light both in and outside of the cabin. When one or more displays is too dark this makes it harder for the driver to see important information in any dark displays, like other cars, people, bicycles, etc.

The overall brightness of the displayed image on the screen can be adjusted using a variety of display elements, such as contrast, brightness (intensity of individual pixels), and a backlight. In the example CMS 15, if an LCD screen is used the backlight 36 is used to adjust the display brightness for a given ambient light condition. Again, it should be understood though that brightness may be provided and adjusted using other techniques. One typical brightness setting can be expressed according to the table below based upon the ambient light sensor signal in the region of the display 18.

TABLE 1

| | | AMBIENT LIGHT SENSOR (LUX) | | | | | |
|---|---|---|---|---|---|---|---|
| | | 0.1 | 1 | 10 | 50 | 100 | 500 |
| OFFSET (%) | 0 | 4 | 11 | 32 | 52 | 75 | 80 |
| | 25 | 5 | 13 | 40 | 64 | 85 | 90 |
| | 50 | 6 | 16 | 50 | 80 | 95 | 100 |
| | 75 | 8 | 20 | 65 | 100 | 100 | 100 |
| | 100 | 11 | 28 | 88 | 100 | 100 | 100 |
| | | BRIGHTNESS (%) | | | | | |

The "offset %", if optionally provided in a particular system, corresponds to a preset cabin illumination value for a cabin that has user adjustable interior cabin lighting (e.g., instrument cluster brightness, switch/user interface brightness, etc.). Older vehicles utilized a rheostat to adjust interior cabin lighting brightness, and newer vehicles typically provide this adjustability digitally via a settings menu in the infotainment system, for example. In the example shown in Table 1, five "brightness curves" are provided (0%, 25%, 50%, 75%, 100%). This allows the driver to choose to have an overall brighter or darker display based on driver selected brightness preferences. For example, if a 50% offset is selected as the preset cabin illumination value (i.e., interior cabin brightness dimmed by half), then the display brightness is selected based upon display brightness values in that offset row (left or right within that row). So an ambient light sensor for a given display that detects 10 lux with a 50% offset, would provide an initial display brightness with 50% intensity for that display. This optional offset can be added either to a single display or to all displays depending on the configuration. Of course, just one setting (i.e., no reference to cabin illumination) can be used, thus providing no offset.

The above Table 1 values are interpolated, as needed, based upon the sensed ambient light and the chosen offset, if available since offset is optional. The 0.1 lux point defines the brightness during night. The range 0 to 1 lux (or up to 0.1 lux, for example) are brightnesses applied during dusk/dawn conditions, which depends on many aspects like chosen sensor, tinted glass attenuation, and sampling. The disclosed method of brightness adjustment is applied-in the full range of ambient light conditions.

Figure 3:
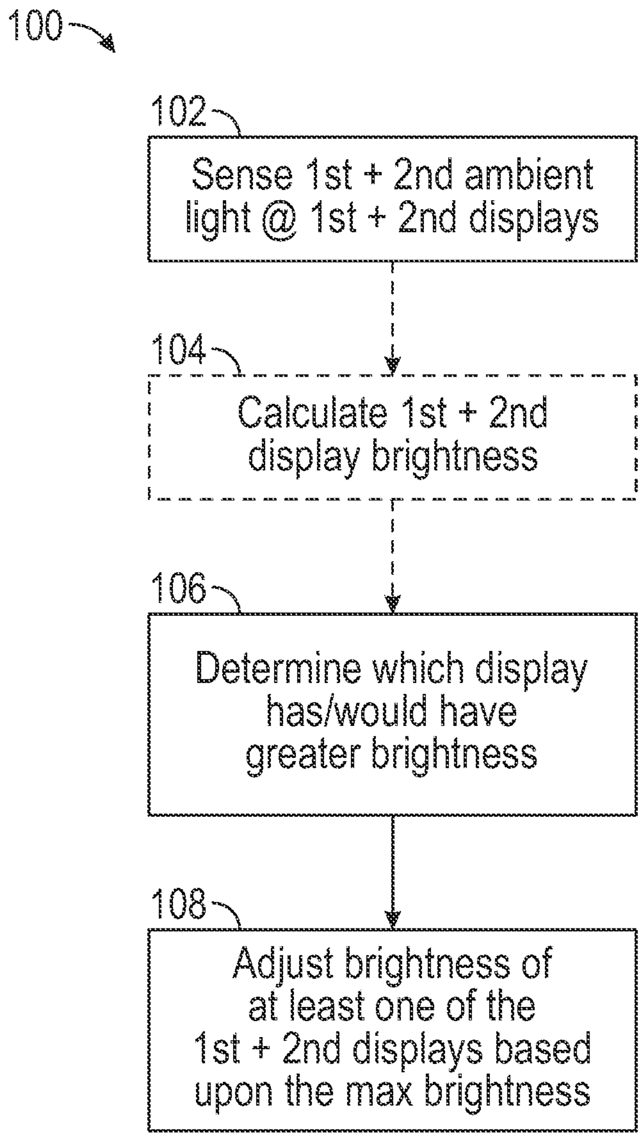
FIG. 3 is a flowchart illustrating a method of controlling display brightness in the CMS.

Referring to FIG. 3, a method 100 of controlling display brightness in the CMS 15 includes detecting first and second ambient lights respectively in a region of first and second displays 18*a*, 18*b* (block 102). In one example method of operation, every update cycle the controller calculates displays initial brightness based on detected ambient light and offset using a configurable brightness table (Table 1) (block 104). Once the initial brightness of each display has been calculated (i.e., the initial brightness for each monitor determined based upon the Table 1 ambient light sensed values), the controller determines which display has the initial greatest brightness (block 106). To balance out the display brightness, the brightness of the darker monitor is "pulled" up. If the initial display brightness values are the same, then the difference would simply be equal 0 and no balancing would occur. It should be understood that the above method may be used to balance monitor brightness in systems having more than two monitors.

As described above, if the calculated initial brightness is different than one another, then the brightness of at least one of the displays is adjusted based upon the comparison (block 108). This adjustment can be performed by increasing the brightness of the darker display, for example.

The above method is an example that first uses calculated display brightness for brightness balancing. To achieve same functionality, the detected first and second ambient lights can be used directly to determine the brightest display and needed display brightness adjustment (i.e., step 104 may be omitted).

Ambient light sensed below 1 lux, for example, corresponds to dark/dusk/dawn ambient light conditions, which are typically in need of better adjustment of the displays, which is accomplished by comparing the ambient light readings from both display's 18*a*, 18*b* ambient light sensors 28*a*, 28*b*. In order to overcome issues with one of the displays 18 being too dark during low light conditions the brightness of the displays 18*a*, 18*b* is balanced. In one example, the display brightness balancing algorithm (Equation 1) checks which display is the brightest and then adjusts the darker display according to the following formula (brightness increased half the difference):

$$BRT\_NEW = BRT\_OLD + (BRT\_MAX - BRT\_OLD)/2 \quad \text{(Equation 1)}.$$

where:

BRT_NEW is the new, calculated brightness % for the darker display,

BRT_OLD is the brightness % of the darker display prior to adjustment and based upon the darker display's associated ambient light sensor, and BRT_MAX is brightness % of the lighter display based upon the lighter display's associated ambient light sensor.

Example 1

Driver display brightness at sensed driver ambient light sensor of 2 lux is 20% according to Table 1.

Passenger display brightness at sensed driver ambient light sensor of <2 lux is 16% according to Table 1.

According to Equation 1, passenger display is adjusted to 18% brightness at <2 lux, i.e., 16%+(20%−16%)/2=18%

Example 2

Driver display brightness at sensed driver ambient light sensor of 1 lux is 16% according to Table 1.

Passenger display brightness at sensed driver ambient light sensor of <1 lux is 8% according to Table 1.

According to Equation 1, passenger display is adjusted to 12% brightness at <1 lux, i.e., 8%+(16%−8%)/2=12%

In the above example, the display having the greater initial brightness is not adjusted and the brightness of the darker display is increased by half the difference in initial brightnesses of the first and second displays 18*a*, 18*b*. With the above implementation not only performance during low light conditions is improved but in addition both display brightness is more homogeneous to the driver's perspective, which is valuable with strong directional light (for example, during sunrise or sunset).

Brightness balancing is only performed when all ambient light sensors are working correctly and there are no other inhibitions. Centralized and decentralized processing configurations can be used to perform the disclosed method. For example, the controller 30 is provided in at least one of the first and second displays 18*a*, 18*b*, that is, in one or both displays. In another example, the controller 30 is provided at a location outside of (i.e., arranged remotely from) the first and second displays 18*a*, 18*b*.

Figure 4:
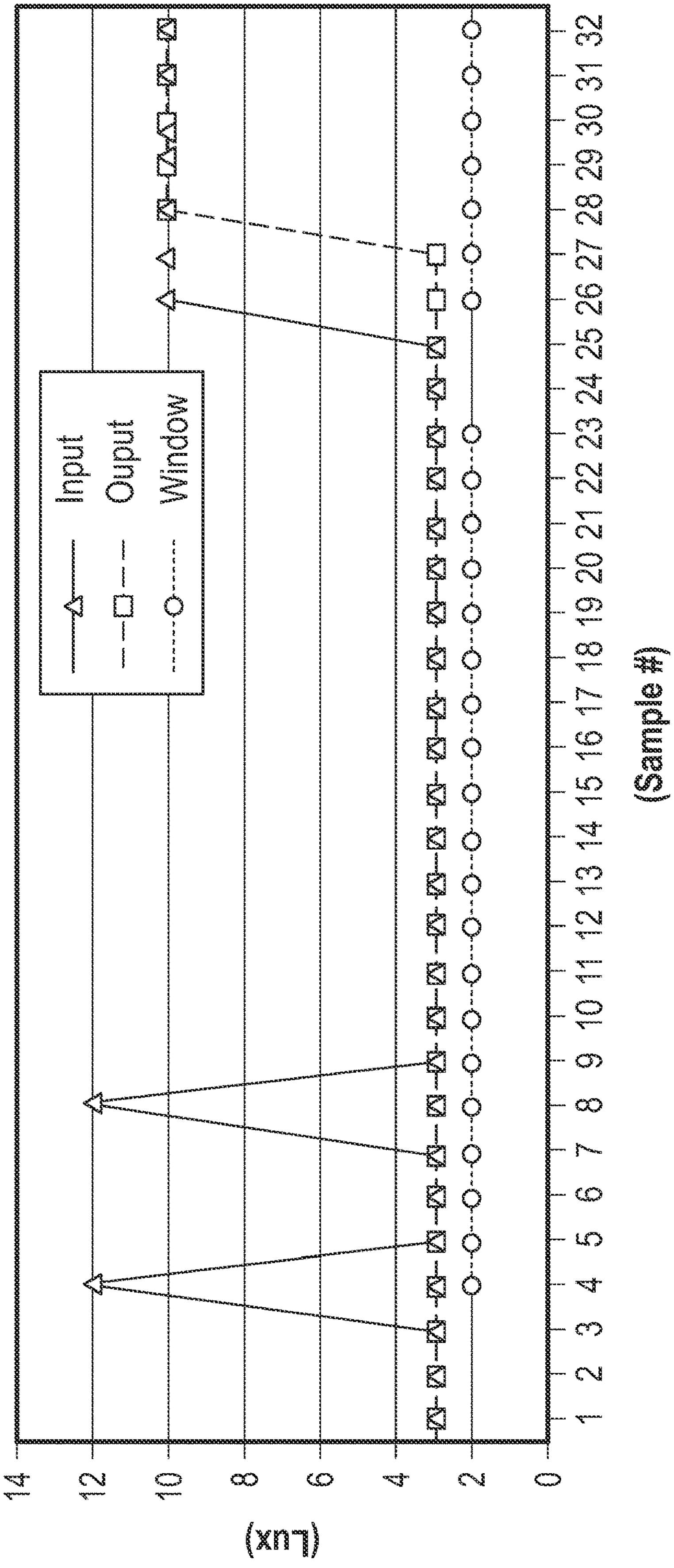
FIG. 4 is a graph illustrating a spike filter in the CMS with display brightness control, where Y-axis is lux and X-axis is sample number.
Figure 5:
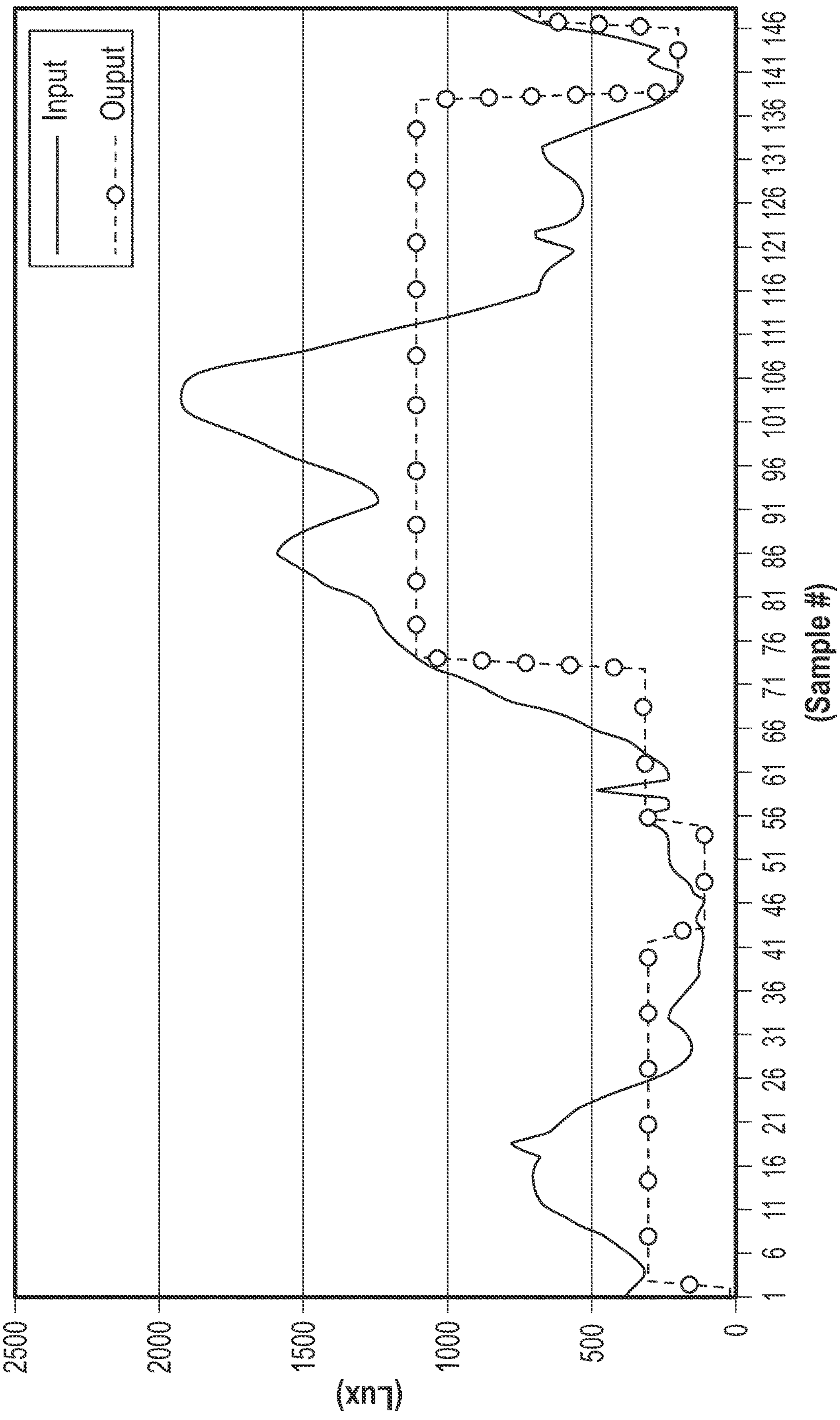
FIG. 5 is a graph illustrating a jitter filter in the CMS with display brightness control, where Y-axis is lux and X-axis is sample number.

Because of steep gradients between configuration points and issues with flickering additional filtering is implemented by using a spike filter and/or a jitter filter, shown in FIGS. 4 and 5.

The spike filter (FIG. 4) will filter input signal changes that are equal to or exceed three times the previous sample, so if the new sample is three times bigger or three times smaller (smaller than $\frac{1}{3}^{rd}$ of the old one) then it will be filtered. In one example, the spike filter is allowed to only filter 2 samples (200 ms) each 2 second moving window (timeout), started after first filtered sample. Since the filtering is done in real-time and not retrospectively such limitation needs to be added in order not to filter out whole rising or falling slope. The number of allowed samples to be filtered was chosen so as to not introduce delay when reacting to brightness changes in order to meet the performance requirements.

For a jitter filter (FIG. 5), the new input value will only be used if it is at least three times bigger or three times smaller (smaller than $\frac{1}{3}^{rd}$ of the old one) than the previous sample. Such filtering will discriminate fluctuations of the input signal. During night lighting conditions, the new value will be used if it is equal or exceeds 2-4 lux, for example.

As described above, the controller 30 ("controller" may generally be referenced as "30") is in communication with the first and second displays 18*a*, 18*b* and in communication with the first and second ambient light sensors 28*a*, 28*b*. The controller 30 is configured to calculate and compare the first and second display brightness respectively and is configured to adjust at least one of the first and second brightnesses of the displays 18 based upon the disclosed method to improve visibility to the driver.

It should be noted that the described controller 30 can be used to implement the various functionality disclosed in this application. The controller 30 may include one or more discrete units.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 30 may be a hardware device for executing software, particularly software stored in memory. The controller 30 can be a custom made or commercially available processor, a central processing unit (CPU), an auxiliary processor among several processors associated with the controller, a semiconductor-based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The disclosed input and output devices that may be coupled to system I/O interface(s) may include input devices, for example but not limited to, a keyboard, mouse, scanner, microphone, camera, mobile device, proximity device, etc. Further, the output devices, for example but not limited to, a printer, display, etc. Finally, the input and output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller 30 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

Every cycle the individual brightness is determined for each display (e.g., according to Table 1), after which an adjustment function is executed to increase the brightness of the darker display(s). The brightness "pull up" in a disclosed example is set to half of the difference, but does not need to be limited to half. This method works with all values between 0% and 100%, but at low % values the positive effect may be limited.

The connection/correlation of display brightness level between multiple displays ensures the displays work together to adjust brightness level. This method could be performed with two displays, three displays, four displays or more. The display brightness integration between multiple displays helps the driver to see important information during setting or rising sunlight conditions when the light is coming from the side of the vehicle to prevent one or more displays from being otherwise too dark as with a typical system.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A camera monitor system for enhancing vehicle operator visibility of a surrounding environment, comprising:

multiple cameras including first and second cameras respectively providing first and second fields of view;

multiple displays including first and second displays configured to respectively depict at least portions of the first and second fields of view, the first and second displays respectively include a first and second brightness;

multiple ambient light sensors including first and second ambient light sensors in proximity respectively to the first and second displays and configured to respectively provide a first and second light ambient signal indicative of an amount of ambient light respectively in a region of the first and second displays, the first and second ambient light sensors facing toward the vehicle operator; and a controller in communication with the first and second displays and in communication with the first and second ambient light sensors, the controller configured to adjust one of the first and second brightnesses of one of the first and second displays based upon at least the other of the first and second ambient light signals of the other of the first and second displays.

2. The system of claim 1, wherein the controller is configured to determine which of the first and second ambient light signals corresponds to the one of the first and second displays having a greater brightness than the other of the first and second displays, and the controller configured to increase a brightness of the other of the first and second displays.

3. The system of claim 2, wherein the controller is configured to increase the brightness of the other of the first and second displays by about half the difference between the first and second brightnesses corresponding respectively to the first and second ambient light signals.

4. The system of claim 1, wherein the first and second fields of view respectively capture left and right sides of a vehicle, each of the first and second fields of view include at least a portion of Class II and/or Class IV views.

5. The system of claim 1, wherein the first and second displays each include a backlight, the first and second brightnesses provided by the backlight of its respective first and second displays.

6. The system of claim 1, wherein the first and second displays each include pixels, and the controller is configured to adjust the first and second brightnesses by changing pixel intensity of the pixels.

7. The system of claim 1, wherein the first and second ambient light sensors are integrated into its respective first and second display.

8. The system of claim 7, wherein the first and second ambient light sensors are provided on a portion of its respective first and second display at a location other than a backside of the first and second display.

9. The system of claim 7, wherein the first and second displays are respectively mounted on left and right A-pillars within a vehicle cab.

10. The system of claim 1, wherein the controller is provided in at least one of the first and second displays.

11. The system of claim 1, wherein the controller is provided at a location outside of the first and second displays.

12. A method of controlling display brightness in a camera monitor system, the method comprising:

detecting first and second ambient light conditions respectively in a region of first and second displays that are arranged in a vehicle cabin and facing toward a vehicle operator; and adjusting a brightness of at least one of the first and second displays based upon the both of the first and second ambient lights.

13. The method of claim 12, wherein the region of each of the first and second displays is in proximity to opposing A-pillars.

14. The method of claim 13, wherein the detecting step is performed at locations on the first and second displays other than a backside of the first and second display.

15. The method of claim 12, comprising a step of calculating first and second display brightness based upon the first and second ambient light conditions, and determining which of the first and second display brightnesses is greater; and wherein the adjusting step includes increasing the brightness of the one of the first and second displays that is darker than the other of the first and second display brightness.

16. The method of claim 15, wherein the brightness of the darker display is increased by half the difference between the first and second ambient lights.

17. The method of claim 15, wherein the brighter of the first and second display is not adjusted.

18. The method of claim 12, wherein the adjusting step is performed based upon a preset cabin illumination value.

19. The method of claim 15, wherein the calculating step is performed based upon a configurable lookup table.

20. The method of claim 12, comprising filtering jitter from first and second signals respectively from the first and second ambient light sensors.

21. The method of claim 12, comprising filtering spike from first and second signals respectively from the first and second ambient light sensors.

* * * * *